(12) United States Patent
Kaburagi et al.

(10) Patent No.: US 11,350,031 B2
(45) Date of Patent: May 31, 2022

(54) IMAGING APPARATUS AND METHOD FOR CONTROLLING THE SAME

(71) Applicant: CANON KABUSHIKI KAISHA, Tokyo (JP)

(72) Inventors: Izumi Kaburagi, Kanagawa (JP); Takayuki Hoshina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 17/088,441

(22) Filed: Nov. 3, 2020

(65) Prior Publication Data
US 2021/0136286 A1 May 6, 2021

(30) Foreign Application Priority Data

Nov. 6, 2019 (JP) .............................. JP2019-201569

(51) Int. Cl.
| H04N 5/225 | (2006.01) |
| H04N 5/232 | (2006.01) |
| G03B 17/14 | (2021.01) |
| G02B 27/64 | (2006.01) |

(52) U.S. Cl.
CPC ......... *H04N 5/23241* (2013.01); *G02B 27/64* (2013.01); *G03B 17/14* (2013.01); *H04N 5/23216* (2013.01)

(58) Field of Classification Search
None
See application file for complete search history.

(56) References Cited

U.S. PATENT DOCUMENTS

| 2009/0238553 | A1* | 9/2009 | Tamura | ................. | G03B 17/14 |
| | | | | | 396/296 |
| 2011/0292225 | A1* | 12/2011 | Toshiro | ............. | H04N 5/23225 |
| | | | | | 348/E5.042 |
| 2013/0028590 | A1* | 1/2013 | Hasuda | ................. | G03B 17/14 |
| | | | | | 396/530 |
| 2017/0289425 | A1* | 10/2017 | Takanashi | .......... | H04N 5/23209 |
| 2018/0027170 | A1* | 1/2018 | Takanashi | .......... | H04N 5/23209 |
| | | | | | 348/211.1 |
| 2018/0059513 | A1 | 3/2018 | Ikeda | | |

FOREIGN PATENT DOCUMENTS

JP      2018033076 A     3/2018

* cited by examiner

*Primary Examiner* — James M Hannett
*Assistant Examiner* — Dwight Alex C Tejano
(74) *Attorney, Agent, or Firm* — Canon U.S.A., Inc. IP Division

(57) ABSTRACT

An imaging apparatus on which an accessory is mountable includes a control unit configured to control first communication with the accessory via a first communication unit and second communication with the accessory via a second communication unit, and, in a case where a communication error in the second communication is detected, perform communication retry processing that repeats transmission of data up to a predetermined number of times until the communication error is resolved. In the case where the communication error in the second communication is detected, the control unit issues a notification corresponding to the communication error to a user without performing the communication retry processing in a case where information corresponding to the fact that the accessory does not receive the data via the second communication is received via the first communication.

6 Claims, 8 Drawing Sheets

IMAGING APPARATUS AND METHOD FOR CONTROLLING THE SAME

BACKGROUND OF THE INVENTION

Field of the Invention

The present invention relates to communication between an imaging apparatus and an accessory, such as an interchangeable lens, mountable on the imaging apparatus.

Description of the Related Art

Conventionally, an accessory detachably attachable to an imaging apparatus (for example, an interchangeable lens and an adapter) has been known to receive supply of power from a power source of the imaging apparatus and communicate various commands and data with the imaging apparatus in a state mounted on the imaging apparatus. Generally, a plurality of terminals electrically connected by contacting each other is provided at attaching portions called mounts of the imaging apparatus and the accessory so as to realize the supply of power and the communication as described above.

When the imaging apparatus and the accessory communicate with each other via the above-described plurality of terminals, a control unit in the imaging apparatus or the accessory may stop the operation due to static electricity, and thus a communication error may occur. In this case, the communication can be recovered by stopping the voltage supplied to the accessory and applying the voltage again to resume the communication.

For example, Japanese Patent Application Laid-Open No. 2018-33076 discusses a technique of performing communication recovery processing (a communication retry) by the interchangeable lens when the communication error has occurred.

SUMMARY OF THE INVENTION

According to an aspect of the present invention, an imaging apparatus on which an accessory is mountable includes a control unit configured to control first communication with the accessory via a first communication unit and second communication with the accessory via a second communication unit, and, in a case where a communication error in the second communication is detected, perform communication retry processing that repeats transmission of data up to a predetermined number of times until the communication error is resolved. In the case where the communication error in the second communication is detected, the control unit issues a notification corresponding to the communication error to a user without performing the communication retry processing in a case where information corresponding to the fact that the accessory does not receive the data via the second communication is received via the first communication.

Further features of the present invention will become apparent from the following description of exemplary embodiments with reference to the attached drawings.

DESCRIPTION OF THE EMBODIMENTS

According to the conventional technique discussed in Japanese Patent Application Laid-Open No. 2018-33076, a communication error recoverable by the communication retry, such as a communication error caused by static electricity, can be resolved. However, a communication error unrecoverable by the communication retry can also occur. For example, in a case where the electric connection portion is in a non-contact state due to inclusion of a foreign object or in a case where adjacent terminals are in contact with each other due to inclusion of an electrically conductive foreign object, the communication error cannot be recovered by the communication retry. Even for the communication error, performing the communication retry processing undesirably leads to a time longer than necessary taken for the recovery from the communication error.

Under these circumstances, the present invention is directed to providing an imaging apparatus that allows communication to be recovered quickly from such a communication error unrecoverable by executing a communication retry, and a method for controlling the imaging apparatus.

In the following description, a first exemplary embodiment of the present invention will be described with reference to the drawings. The first exemplary embodiment will be described based on an example in which an intermediate accessory and/or an interchangeable lens are/is mounted on a camera main body. The intermediate accessory and the interchangeable lens are each an example of an accessory, and the camera main body is an example of an imaging apparatus.

Figure 4:
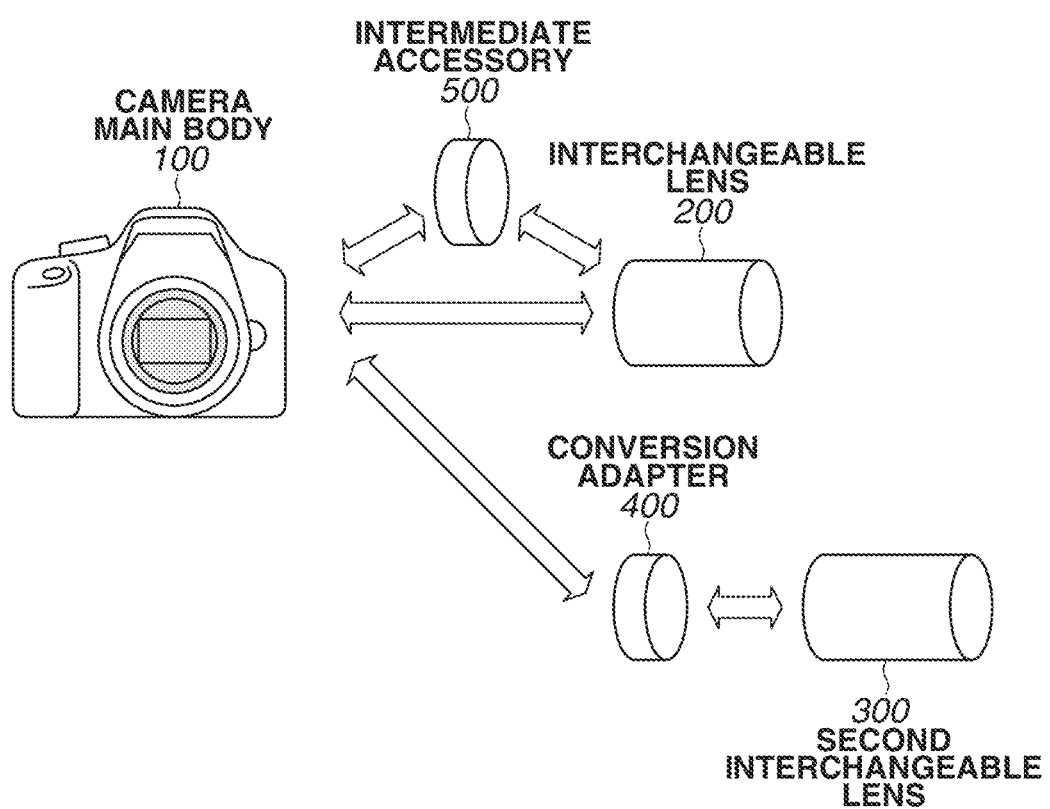
FIG. 4 is a system diagram illustrating examples of types of accessories mountable on the camera main body according to the exemplary embodiment of the present invention.

Accessories connectable to a camera main body 100 will be described with reference to FIG. 4. A first interchangeable lens 200 is an example of an accessory directly mountable on the camera main body 100. An intermediate accessory 500 is also an example of the accessory directly mountable on the camera main body 100. The first interchangeable lens 200 can be directly mounted on the camera main body 100. Further, the first interchangeable lens 200 can also be connected to the camera main body 100 via the intermediate accessory 500.

Further, a second interchangeable lens 300 can be indirectly mounted on the camera main body 100 via a conversion adapter 400. In other words, the second interchangeable lens 300 cannot be directly coupled with the camera main body 100. Then, the conversion adapter 400 can be directly attached to the second interchangeable lens 300 and the camera.

In the above-described manner, the first interchangeable lens 200, the intermediate accessory 500, and the conversion adapter 400 can be directly mounted on the camera main body 100. Further, the second interchangeable lens 300 can be mounted on the camera main body 100 with the conversion adapter 400 therebetween. Further, the present exemplary embodiment can be configured in such a manner that the first interchangeable lens 200 is mounted on the camera main body 100 via the intermediate accessory 500.

Hereinafter, the first interchangeable lens 200 and the second interchangeable lens 300 will be collectively referred to as an interchangeable lens in descriptions applicable in common to the first interchangeable lens 200 and the second interchangeable lens 300. Similarly, the conversion adapter 400 and the intermediate accessory 500 will be collectively referred to as an adapter.

(Configuration of Intermediate Accessory 500)

Figure 1:
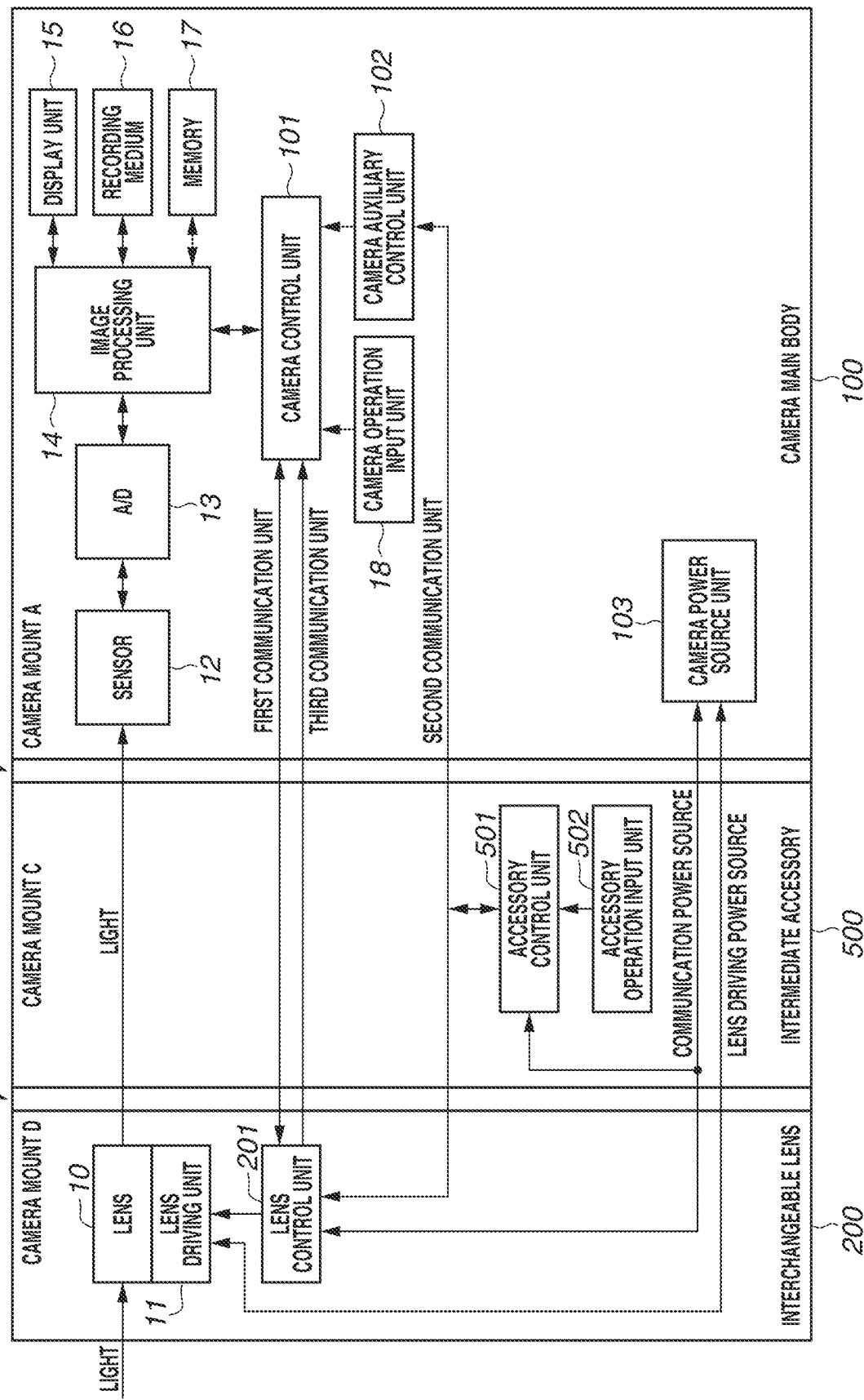
FIG. 1 is a block diagram illustrating an example of a state in which a first interchangeable lens is mounted on a camera main body via an intermediate accessory according to an exemplary embodiment of the present invention.

Next, an example in which the first interchangeable lens 200 is mounted on the camera main body 100 via the intermediate accessory 500 will be described with reference to FIG. 1. FIG. 1 is a block diagram illustrating an example of a state in which the first interchangeable lens 200 is mounted on the camera main body 100 via the intermediate accessory 500 according to the present exemplary embodiment. As illustrated in FIG. 1, the respective mounts of the intermediate accessory 500 and the first interchangeable lens 200 will be collectively referred to as a mount 3.

The intermediate accessory 500 includes a lens mount B, which is the same as the mount of the first interchangeable lens 200 on one side to which the camera main body 100 is coupled. Further, the intermediate accessory 500 includes a camera mount A, which is the same as the mount of the camera main body 100, on the opposite side from the lens mount B.

The intermediate accessory 500 includes an accessory operation input unit 502 to which a user can input an operation, and an accessory control unit 501 which is equipped with a central processing unit (CPU) that comprehensively controls the operation of the intermediate accessory 500. The accessory control unit 501, for example, controls communication between the accessory control unit 501 and a camera control unit 101 via a mount 1 or receives an input operation to the accessory operation input unit 502. In the present exemplary embodiment, the intermediate accessory 500 is, for example, an extender including a not-illustrated lens group for zoom magnification or an accessory capable of adding some camera function as operations of both the camera main body 100 and the first interchangeable lens 200.

The intermediate accessory 500 includes the lens mount B the same as the mount of the first interchangeable lens 200 on the one side to which the camera main body 100 is coupled. Further, the intermediate accessory 500 includes the camera mount A the same as the mount of the camera main body 100 on the opposite side from the lens mount B.

(Internal Configuration of Intermediate Accessory 500)

Figures 6, 6A:
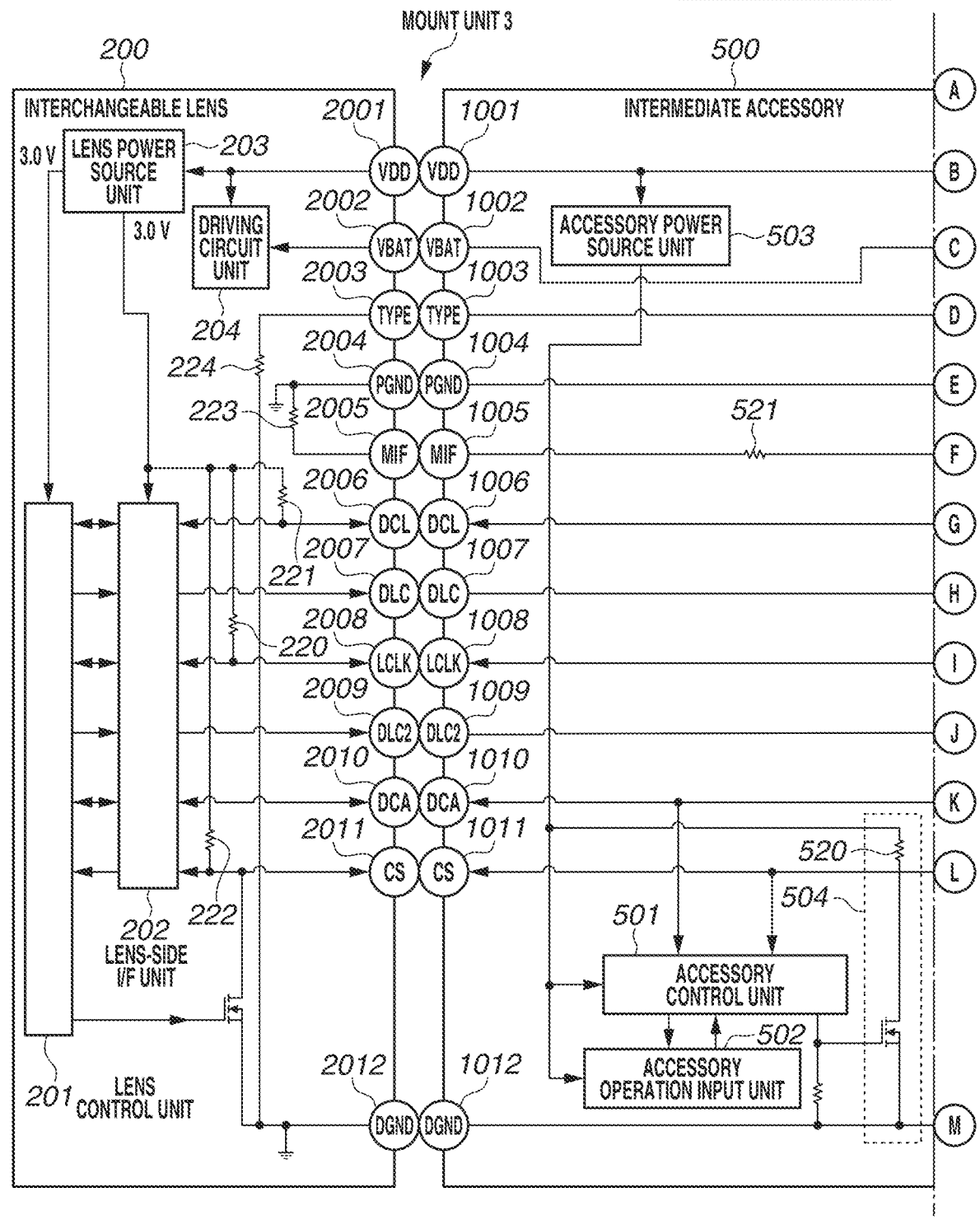
FIGS. 6A and 6B collectively illustrates an example of how mounts are connected to each other when the first interchangeable lens is mounted on the camera main body via the intermediate accessory according to the exemplary embodiment.
Figure 6B:
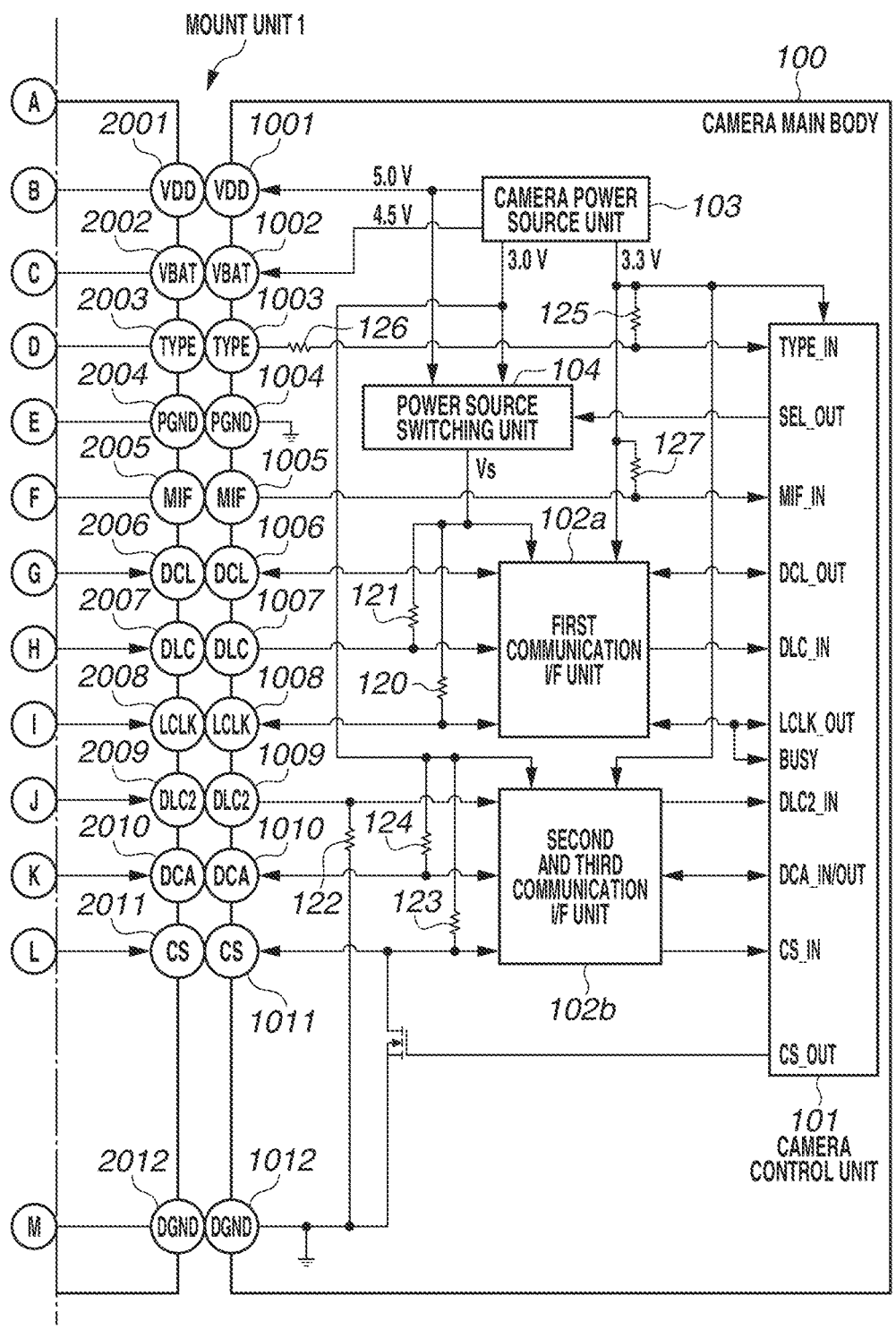

Next, the internal configuration and the operation of a circuit included in the intermediate accessory 500 will be described with reference to FIGS. 6A and 6B. A communication control power source (voltage drain (VDD)) is supplied from a camera power source unit 103 to an accessory power source unit 503 of the intermediate accessory 500 as described above via a VDD terminal in a state where the intermediate accessory 500 is mounted on the camera main body 100. In this state, the accessory power source unit 503 generates a power source for supply to the accessory control unit 501 including the accessory CPU and the accessory operation input unit 502 based on VDD supplied from the camera main body 100 side.

The accessory operation input unit 502 allows the user to make a setting regarding manual focusing and a setting regarding an aperture diameter of a diaphragm by performing an input operation, and includes, for example, a ring member rotatable in the circumferential direction of the intermediate accessory 500 as an operation member that the user can manually operate.

The operation information input to the accessory operation input unit 502 is reflected in various kinds of settings of the camera main body 100 using second communication via a terminal corresponding to a second communication unit between the accessory control unit 501 and the camera control unit 101 or a first lens control unit 201. More specifically, the accessory control unit 501 controls an open interface unit 504 upon detecting the operation information input to the accessory operation input unit 502. Then, the accessory control unit 501 notifies the camera control unit 101 of a communication request according to a change in a signal level of a CS terminal 2011 (a first terminal) included in the second communication unit. Further, in this case, the accessory control unit 501 transmits the detected operation information to the camera control unit 101 as data using a DCA terminal 2010 (a second terminal) included in the second communication unit.

(Configuration of Camera Main Body 100)

The camera main body 100 includes the camera power source unit 103, which supplies power to each block in the camera main body 100. The camera power source unit 103 not only supplies power to the camera main body 100 but also supplies a power source to the intermediate accessory 500. Further, the camera main body 100 includes an image sensor 12, which photoelectrically converts a subject image as an optical image formed by a lens group (not illustrated) in the first interchangeable lens 200 and outputs an electric signal. Further, the camera main body 100 includes an analog-digital (A/D) conversion unit 13 that converts the analog electric signal Output from the image sensor 12 into a digital signal, and an image processing unit 14 that generates an image signal by performing various kinds of image processing on the generated digital signal. The image signal (a still image or a moving image) generated by the image processing unit 14 is, for example, displayed on a display unit 15 and recorded into a recording medium 16.

A camera auxiliary control unit 102 supplementarily controls for the camera control unit 101. For example, when the camera main body 100 is powered off, the camera control unit 101 is in an inactive state but the camera auxiliary control unit 102 which consumes lower power controls time management and the like. If the intermediate lens and the conversion adapter 400 are mounted onto the camera main body 100 when the camera lain body 100 is powered off, the camera auxiliary control unit 102 communicates with the conversion adapter 400 and determines the types of the interchangeable lens and the conversion adapter 400.

In a case where the camera control unit 101 has a high processing capability and consumes only low power, the camera control unit 101 may entirely perform the control of the above-described camera auxiliary control unit 102 in the camera.

Power is output from the camera main body 100 as a communication power source 1001 and a lens driving power source 1002. The communication power source 1001 serves as a power source for the lens control unit 201 and the accessory control unit 501, and is supplied from the camera main body 100 to the intermediate accessory 500 and the first interchangeable lens 200 at the time of the communication. On the other hand, the lens driving power source 1002 is supplied from the camera main body 100 to a lens driving unit 11 via the intermediate accessory 500 to drive the lens after the communication is established.

(Example of Issue)

In the case where the imaging apparatus and the accessory communicate with each other via the plurality of terminals as described above, a communication error may occur. For example, a communication error may occur when the control unit inside the imaging apparatus or the accessory accidentally stops due to static electricity. In this case, the communication can be recovered by stopping the voltage supplied to the accessory and applying the voltage again to resume the communication. Under these circumstances, there is a technique for performing communication retry processing that retransmits data until the communication error is resolved up to a predetermined number of times, when the communication error has occurred.

However, this communication retry processing cannot resolve the communication error depending on the cause of the communication error. For example, when the electric connection portion is in a non-contact state due to a foreign object included therein or when adjacent terminals are brought into contact with each other due to an electrically conductive foreign object included therein, the communication error cannot be recovered until the foreign object causing the communication error is removed. However, the conventional technique fails to provide a method for determining whether the communication error can be resolved by performing the communication retry processing or a manual operation by the user is necessary to resolve the communication error. This raises such an issue that, for example, performing the communication retry processing in any of these cases takes extra time to recover from the communication error. If the imaging timing is affected by this, the user can even end up missing the imaging timing.

(Accessory Startup Processing)

Figure 2:
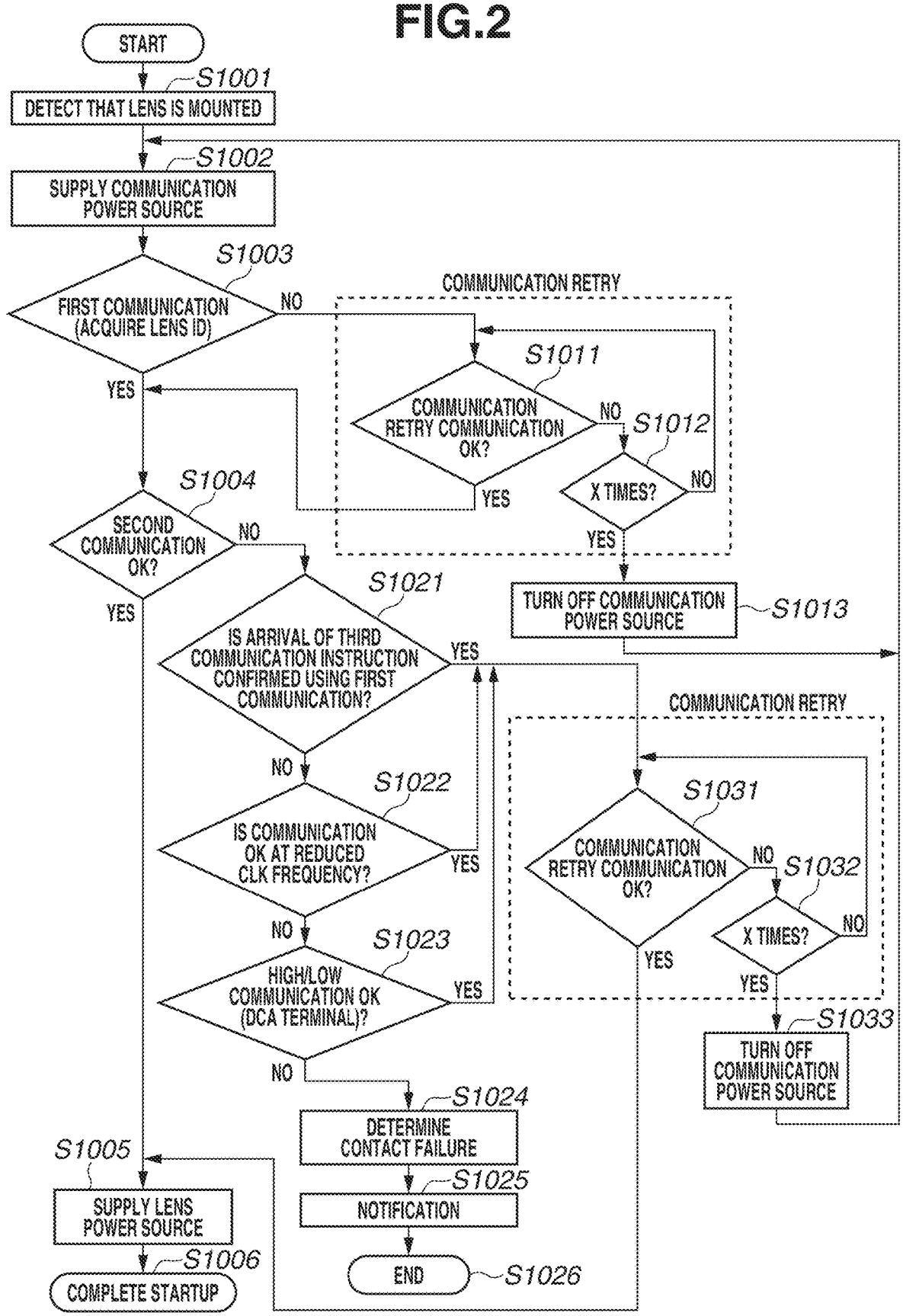
FIG. 2 is a flowchart illustrating a flow of processing performed by an interchangeable lens-type camera system according to the exemplary embodiment of the present invention.

In the following description, the first exemplary embodiment will be further described focusing on an example of a configuration for recovering the communication further quickly from the communication error unrecoverable by the communication retry processing. This configuration will be described with reference to the block diagram of FIG. 1 and a flowchart of FIG. 2.

In step S1001, the camera control unit 101 detects that the intermediate accessory 500 is mounted by monitoring a not-illustrated detection terminal disposed at the mount A. When the first interchangeable lens 200 is connected via the intermediate accessory 500, the camera control unit 101 detects that the first interchangeable lens 200 is mounted by monitoring the detection terminal in a similar manner.

In step S1002, in a case where the camera control unit 101 detects that the first interchangeable lens 200 is mounted, the camera main body 100 outputs the communication power source 1001. The communication power source 1001 is the power source for supplying power for communication to the first interchangeable lens 200 and the intermediate accessory 500. The accessory control unit 501 and the lens control unit 201 control the communication using power supplied from the communication power source 1001. The camera control unit 101 and the lens control unit 201 can communicate with each other using first communication and third communication, and the camera auxiliary control unit 102, the lens control unit 201, and the accessory control unit 501 can communicate with one another using the second communication unit.

In step S1003, the camera control unit 101 and the lens control unit 201 carry out the first communication via a first communication unit. If there is no problem with the communication (YES in step S1003), the processing proceeds to step S1004. If a communication error is detected in the first communication and the lens control unit 201 and the camera control unit 101 cannot communicate with each other (NO in step S1003), the processing proceeds to step S1011.

In step S1004, the camera control unit 101 and the accessory control unit 501 carry out the second communication via the second communication unit. For example, the type of the adapter, the identification number, and the like are transmitted from the accessory control unit 501 to the camera auxiliary control unit 102 by the second communication. When the transmission is completed, the processing proceeds to step S1005.

When both the first communication and the second communication can be established, then in step S1005, power is output from the lens driving power source 1002 of the camera main body 100 and is supplied to the first interchangeable lens 200. The first interchangeable lens 200 operates to conduct a zoom function and an image stabilization function using the power from the lens driving power source 1002.

In step S1011, the camera control unit 101 causes data, such as a discrimination number of the lens, to be retransmitted from the first interchangeable lens 200 to the camera control unit 101, and determines whether the camera control unit 101 can receive the data. If the first communication can be carried out (YES in step S1011), the processing proceeds to step S1004. If the camera control unit 101 cannot receive the data (NO in step S1011), the processing proceeds to step S1012.

In step S1012, the camera control unit 101 determines whether the number of times that the data has been retransmitted in step S1011 is equal to or more than a predetermined number of times set as an upper limit on the number of times of retry. If the communication has not been succeeded even after the data has been retransmitted the predetermined number of times or more (YES in step S1012), the processing proceeds to step S1013. The processing in step S1011 and step S1012 correspond to the communication retry processing in the first communication.

In step S1013, the camera control unit 101 turns off and on again the communication power source 1001. The communication power source 1001 is turned off here so that the lens control unit 201 and the accessory control unit 501 are rest.

In step S1021, the camera control unit 101 confirms, using the first communication, whether the data transmitted from the camera auxiliary control unit 102 via the second communication has reached the lens control unit 201. If the data has reached the lens control unit 201 (YES in step S1021), the camera control unit 101 determines that the communication from the camera auxiliary control unit 102 to the lens control unit 201 has succeeded and an error has occurred in a reply signal from the lens control unit 201 to the camera auxiliary control unit 102 for some reason. In other words, the camera control unit 101 determines that there is no problem with the connection of the second communication. Then in steps S1031 and S1032, the camera control unit 101 performs the communication retry processing in the second communication. The communication retry processing in steps S1031 and S1032 is similar to the communication retry processing in the first communication in steps S1011 and S1012, and therefore the description thereof will be omitted herein.

In step S1022, the camera auxiliary control unit 102 attempts the transmission/reception again after reducing a clock signal LCLK for the second communication. If the communication is successful, it can be considered that the communication error has occurred because the signal waveform is distorted due to the high speed of the communication in step S1004. In this case, it is determined that there is no problem with the connection of the second communication, and then the camera control unit 101 performs the communication retry processing in step S1031.

In step S1023, the camera auxiliary control unit 102 fixes the signal level of the signal line of the DCA terminal in the second communication from the camera main body 100 to the first interchangeable lens 200 to a High level, and causes the lens control unit 201 to detect that the signal level is set to the High level. Next, the camera auxiliary control unit 102 fixes the signal level to a Low level, and causes the lens control unit 201 to detect that the signal level is set to the Low level.

If the lens control unit 201 can detect the High level or the Low level of the signal line of the DCA terminal as output from the camera control unit 101 (YES in step S1023), the camera control unit 101 determines that there is no problem with the connection of the second communication. Then, the processing proceeds to step S1031, in which the camera control unit 101 performs the communication retry processing.

If the communication error is still unresolved even after the processes in step S1021, step S1022, and step S1023 are performed, the camera control unit 101 determines that a connection failure has occurred in the second communication in step S1024. Then, the processing proceeds to step S1025.

Figure 5A:
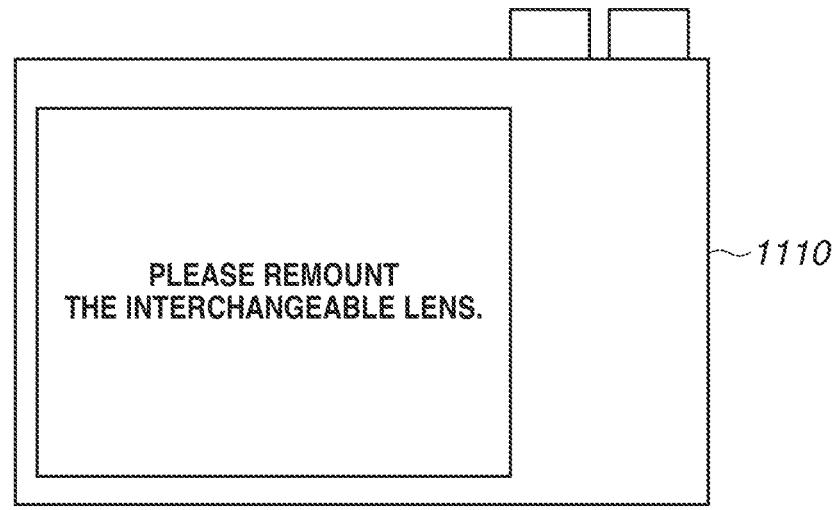
FIGS. 5A, 5B, and 5C each illustrate an example of a user interface (UI) displayed on a display unit on the camera main body according to the exemplary embodiment of the present invention.
Figure 5B:
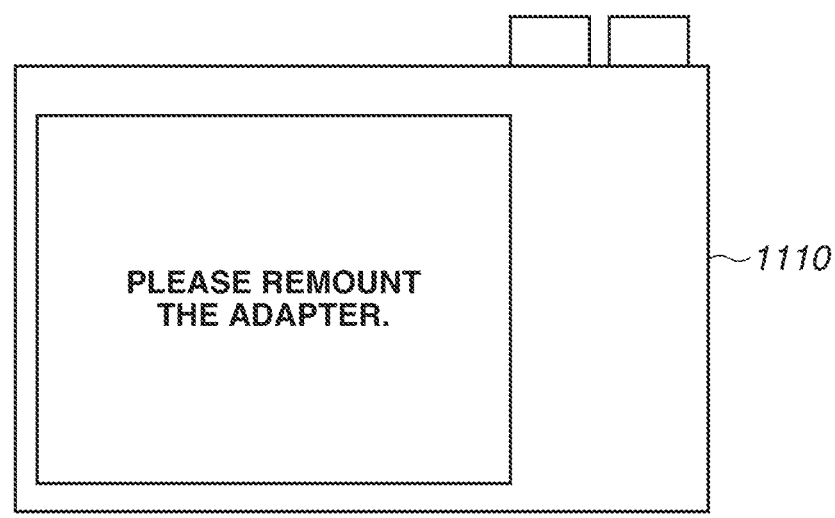

In step S1025, the camera control unit 101 presents a message to the user, for example, "please remount the interchangeable lens" or "please remount the adapter" as illustrated in FIGS. 5A and 5B, as a notification, thereby prompting the user to remount the lens unit or the adapter.

Step S1033 is similar processing to step S1013, and therefore the description thereof will be omitted herein.

Figure 3:
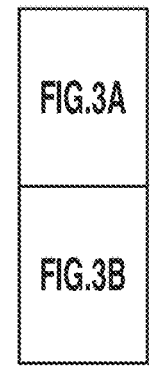
FIGS. 3A and 3B are collectively a flowchart illustrating a flow of processing performed by an interchangeable lens-type camera system according to an exemplary embodiment of the present invention.
Figure 3A:
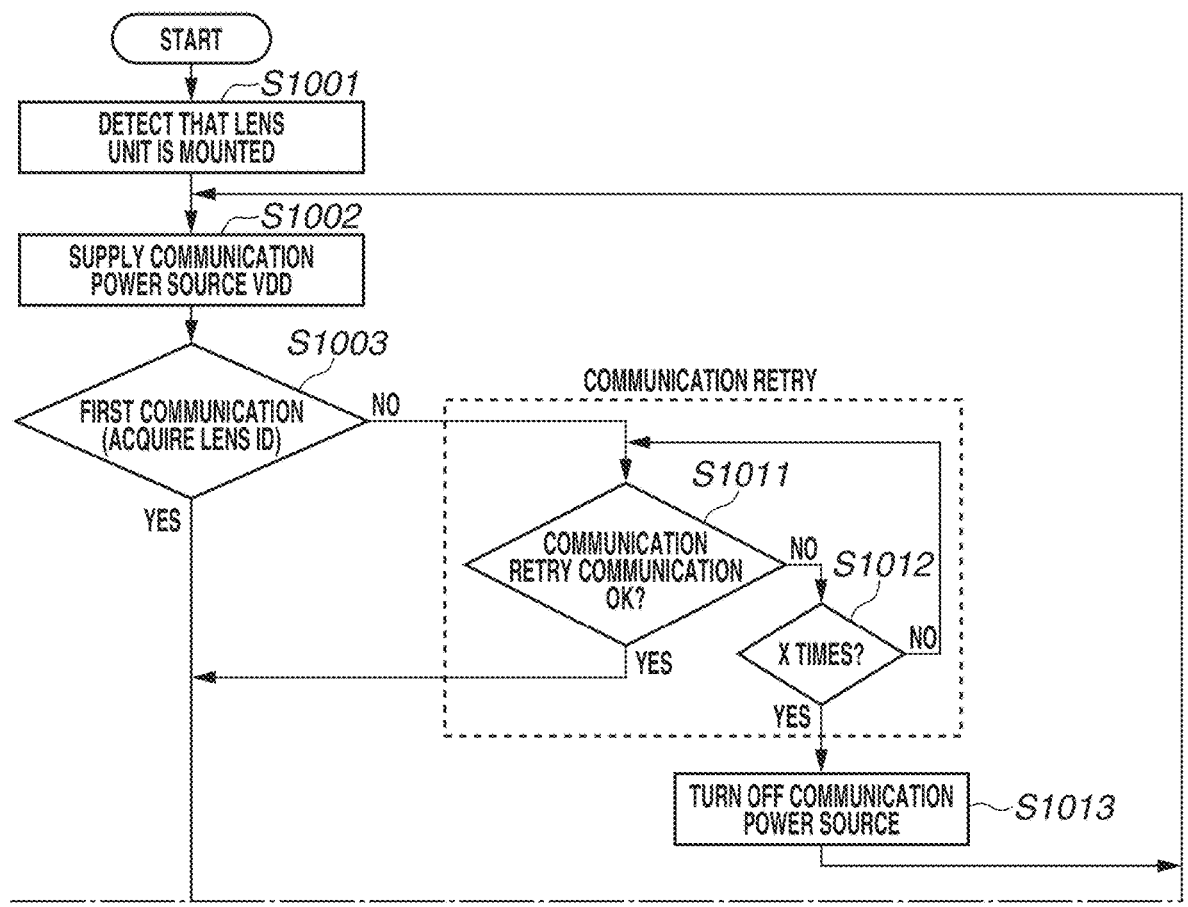
Figure 3B:
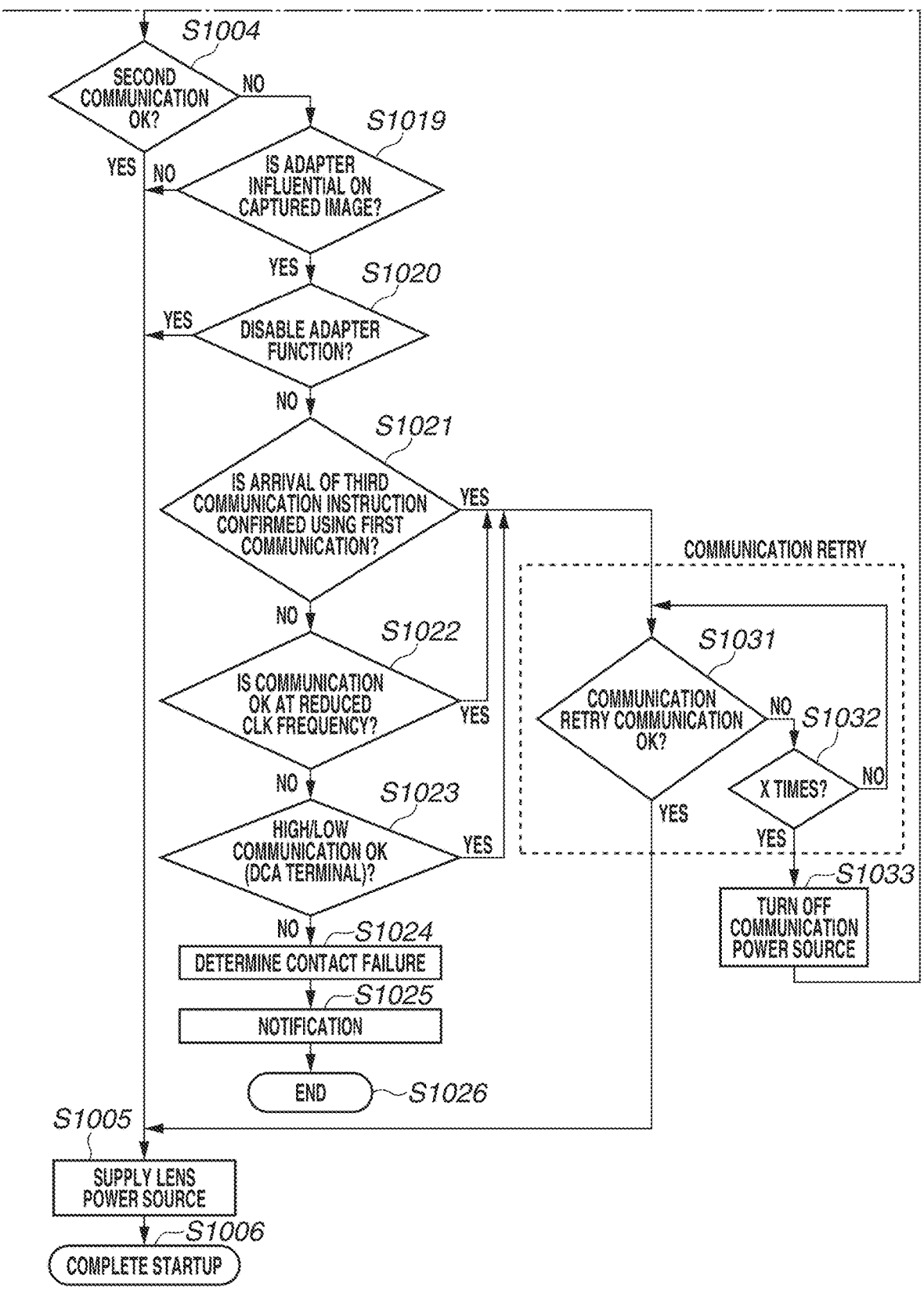

In the following description, a second exemplary embodiment will be described as an example where the present invention is applied with reference to a flowchart illustrated in FIGS. 3A and 3B. The second exemplary embodiment will be described, focusing on differences from FIG. 2 and omitting the descriptions of common features.

If a communication error has occurred in the second communication between the accessory control unit 501 and the camera auxiliary control unit 102 in step S1004 (NO in step S1004), the processing proceeds to step S1019.

In step S1019, the camera auxiliary control unit 102 determines whether the intermediate accessory 500 is influential on a captured image. For example, a not-illustrated common terminal for the determination is prepared on the mount. A determination pin is pulled down or pulled up in advance with an arbitrary resistance value to a GND side or a communication power source side in the intermediate accessory 500. The camera auxiliary control unit 102 acquires a signal of a determination terminal in the intermediate accessory 500 by the camera control unit 101, and determines whether the adapter is influential on an image. If it is determined that the intermediate accessory 500 is the intermediate accessory 500 not influential on a captured image (NO in step S1019), the processing proceeds to step S1005, and the camera control unit 101 outputs the lens driving power source 1002 without establishing the communication of the second communication.

Figure 5C:
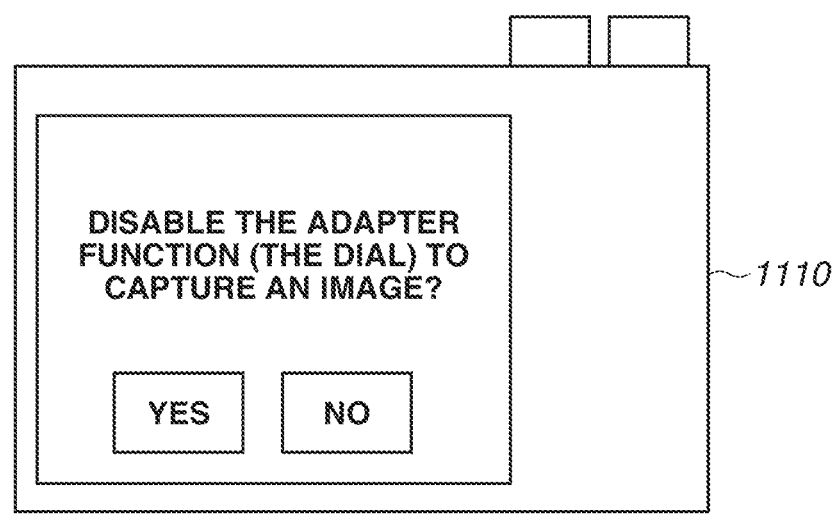

If the intermediate accessory 500 is influential on an image (YES in step S1019), in step S1020, the camera control unit 101 prompts the user to determine whether to choose to disable the adapter function, such as an operation function like a dial, as illustrated in FIG. 5C. If the user chooses to disable the function (YES in step S1020), the processing proceeds to step S1005, and the camera control unit 101 outputs the lens driving power source 1002 without establishing the communication of the second communication.

(Others)

The exemplary embodiments of the present invention have been described above. The present invention however is not limited to these exemplary embodiments and can be modified and changed in various manners within the range of the spirit thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-201569, filed Nov. 6, 2019, which is hereby incorporated by reference herein in its entirety.

What is claimed is:

1. An imaging apparatus on which an accessory is mountable, the imaging apparatus comprising:

a control unit configured to control first communication with the accessory via a first communication unit and second communication with the accessory via a second communication unit, and, in a case where a communication error in the second communication is detected, perform communication retry processing that repeats transmission of data up to a predetermined number of times until the communication error is resolved,
wherein, in the case where the communication error in the second communication is detected, the control unit issues a notification corresponding to the communication error to a user without performing the communication retry processing in a case where information corresponding to the fact that the accessory does not receive the data via the second communication is received via the first communication.

2. The imaging apparatus according to claim 1, wherein, in the case where the communication error in the second communication is detected, the control unit performs the communication retry processing in a case where information corresponding to the fact that the accessory receives the data via the second communication is received via the first communication.

3. The imaging apparatus according to claim 1, wherein, in the case where the information corresponding to the fact that the accessory does not receive the data via the second communication is received via the first communication according to the detection of the communication error in the second communication, the control unit performs the communication retry processing in a case where information corresponding to the fact that the accessory receives the data via the second communication is received via the first communication according to retransmission of the data at a reduced communication speed.

4. The imaging apparatus according to claim 1, wherein the second communication unit includes a first terminal and a second terminal, and wherein transmission of the data via the second terminal in the second communication is controlled according to a notification utilizing a change in a signal level of the first terminal.

5. The imaging apparatus according to claim 4, wherein, in the case where the information corresponding to the fact that the accessory does not receive the data via the second communication is received via the first communication according to the detection of the communication error in the second communication, the control unit performs the communication retry processing in a case where the first terminal is determined to be communicable.

6. A method for controlling an imaging apparatus on which an accessory is mountable and which includes a control unit, the control unit being configured to control first communication with the accessory via a first communication unit and second communication with the accessory via a second communication unit, and, in a case where a communication error in the second communication is detected, perform communication retry processing that repeats transmission of data up to a predetermined number of times until the communication error is resolved, the method comprising:

in the case where the communication error in the second communication is detected, issuing a notification corresponding to the communication error to a user without performing the communication retry processing in a case where information corresponding to the fact that the accessory does not receive the data via the second communication is received via the first communication.

\* \* \* \* \*